United States Patent
Paniharam et al.

(10) Patent No.: US 11,629,641 B2
(45) Date of Patent: Apr. 18, 2023

(54) FUEL DISTRIBUTION MANIFOLD

(71) Applicant: General Electric Company, Schenectady, NY (US)

(72) Inventors: Rajendra Paniharam, Bangalore (IN); Diana Alonso, Greenville, SC (US); Elizabeth Grace Hildebrand, Greenville, SC (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/036,657

(22) Filed: Sep. 29, 2020

(65) Prior Publication Data

US 2022/0026069 A1    Jan. 27, 2022

(51) Int. Cl.
*F02C 7/228* (2006.01)
*F02C 7/22* (2006.01)
*F23R 3/34* (2006.01)

(52) U.S. Cl.
CPC ............. *F02C 7/222* (2013.01); *F02C 7/228* (2013.01); *F23R 3/34* (2013.01); *F23R 3/346* (2013.01)

(58) Field of Classification Search
CPC ..................................................... F02C 7/222
See application file for complete search history.

(56) References Cited

U.S. PATENT DOCUMENTS

| 5,551,228 A | 9/1996 | Mick et al. |
| 2011/0154824 A1 | 6/2011 | Fiebig et al. |
| 2014/0260274 A1* | 9/2014 | Stoia ................. F02C 7/222 60/739 |
| 2015/0176496 A1 | 6/2015 | Zordan et al. |
| 2016/0245182 A1* | 8/2016 | Elwasila ................. F23R 3/34 |
| 2018/0087776 A1* | 3/2018 | Flanagan ............... F23R 3/283 |
| 2018/0195438 A1 | 7/2018 | Chechi |

FOREIGN PATENT DOCUMENTS

| GB | 2320063 A | 6/1998 |
| JP | 2013139805 A | 7/2013 |

OTHER PUBLICATIONS

European Search Report Corresponding to Application No. 21185688 dated Dec. 8, 2021.

* cited by examiner

*Primary Examiner* — Gerald L Sung
*Assistant Examiner* — Alyson Joan Harrington
(74) *Attorney, Agent, or Firm* — Dority & Manning, P.A.

(57) ABSTRACT

Fuel distribution manifolds and combustors are provided. A fuel distribution manifold includes a main body and a fuel circuit that is defined within the main body. The fuel circuit includes an inlet section extending generally axially from an inlet to a first branch section and a second branch section. The first branch section and the second branch section diverge circumferentially away from each other as they extend axially from the inlet section to a respective first outlet and a respective second outlet.

18 Claims, 6 Drawing Sheets

FUEL DISTRIBUTION MANIFOLD

FIELD

The present disclosure relates generally to a combustor for a gas turbine. In particular, the disclosure relates to a fuel distribution manifold for providing fuel to a fuel injector disposed downstream from a primary combustion zone defined within the combustor.

PRIORITY STATEMENT

The present application claims priority to Indian Provisional Patent Application Serial No. 202011031813, filed Jul. 24, 2020, which is incorporated by reference herein in their entirety.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The combustion gases then exit the gas turbine via the exhaust section.

In order to balance overall emissions performance and to facilitate turndown operations, certain combustor designs include multiple fuel injectors that are arranged around the liner and positioned generally downstream from the combustion zone. The fuel injectors generally extend radially to or through the liner to provide for fluid communication into the combustion gas flow field. This type of system is commonly known in the art and/or the gas turbine industry as Axial Fuel Staging ("AFS") or, sometimes, as distributed combustion.

In operation, a portion of the compressed working fluid is routed through and/or around each of the fuel injectors and into the combustion gas flow field. A liquid or gaseous fuel from the fuel injectors is injected into the flow of the compressed working fluid to provide a lean or air-rich combustible mixture, which combusts as it mixes with the hot combustion gases in the combustion gas flow field, thereby increasing the firing temperature of the combustor without producing a corresponding increase in the residence time of the combustion gases inside the combustion zone. As a result, the overall thermodynamic efficiency of the combustor may be increased without sacrificing overall emissions performance.

Fuel manifolds are often used for partitioning the fuel received from an external source between one or more AFS injectors. Current fuel distribution manifolds include multiple parts, joints, and sharp/aggressive turns that can cause fuel leaks and/or pressure drops across the fuel manifold. As a result, designers must use fuel tubes having a large diameter, which require one or more costly fuel bellows, in order to accommodate for the pressure drops across the fuel manifold. Therefore, an improved fuel manifold having a reduced pressure drop, thereby increasing overall gas turbine performance and cost savings, is desired in the art.

BRIEF DESCRIPTION

Aspects and advantages of the fuel distribution manifolds and combustors in accordance with the present disclosure will be set forth in part in the following description, or may be obvious from the description, or may be learned through practice of the technology.

In accordance with one embodiment, a fuel distribution manifold for use in a combustor of a turbomachine is provided. The fuel distribution manifold includes a main body and a fuel circuit that is defined within the main body. The fuel circuit includes an inlet section extending generally axially from an inlet; a first branch section fluidly coupled to the inlet section and extending to a first outlet; and a second branch section fluidly coupled to the inlet section and extending to a second outlet. The first branch section and the second branch section diverge circumferentially away from each other as the first branch section and the second branch section extend axially from the inlet section to the first outlet and the second outlet, respectively.

In accordance with another embodiment, a combustor is provided. The combustor includes a combustor casing and an end cover coupled to the combustor casing. The combustor also includes a primary fuel nozzle that extends axially downstream from the end cover within the combustor casing. A primary combustion zone is defined downstream from the primary fuel nozzle. The combustor also includes a plurality of fuel injectors downstream from the primary combustion zone. A fuel distribution manifold is coupled to a combustor casing of the combustor and is fluidly coupled to the plurality of fuel injectors. The fuel distribution manifold includes a main body and a fuel circuit that is defined within the main body. The fuel circuit includes an inlet section extending generally axially from an inlet; a first branch section fluidly coupled to the inlet section and extending to a first outlet; and a second branch section fluidly coupled to the inlet section and extending to a second outlet. The first branch section and the second branch section diverge circumferentially away from each other as the first branch section and the second branch section extend axially from the inlet section to the first outlet and the second outlet, respectively.

These and other features, aspects and advantages of the present fuel distribution manifolds and combustors will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present fuel distribution manifolds and combustors, including the best mode of making and using the present systems and methods, directed to one of ordinary skill in the art, is set forth in the specification, which makes reference to the appended figures, in which.

DETAILED DESCRIPTION

Reference now will be made in detail to embodiments of the present fuel distribution manifolds and combustors, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows.

The term "radially" refers to the relative direction that is substantially perpendicular to an axial centerline of a particular component, the term "axially" refers to the relative direction that is substantially parallel and/or coaxially aligned to an axial centerline of a particular component, and the term "circumferentially" refers to the relative direction that extends around the axial centerline of a particular component.

Terms of approximation, such as "generally" or "about" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

Figure 1:
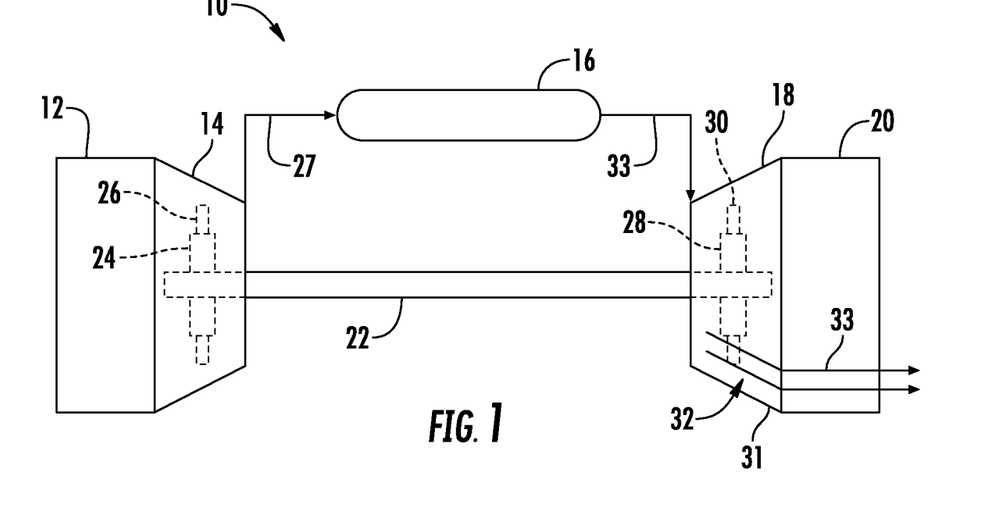
FIG. 1 is a schematic illustration of a turbomachine in accordance with embodiments of the present disclosure.

Referring now to the drawings, FIG. 1 illustrates a schematic diagram of one embodiment of a turbomachine, which in the illustrated embodiment is a gas turbine 10. Although an industrial or land-based gas turbine is shown and described herein, the present disclosure is not limited to an industrial or land-based gas turbine unless otherwise specified in the claims. For example, the subject technology as described herein may be used in any type of turbomachine including, but not limited to, a steam turbine, an aircraft gas turbine, or a marine gas turbine.

As shown, gas turbine 10 generally includes an inlet section 12, a compressor section 14 disposed downstream of the inlet section 12, a plurality of combustors 17 (FIG. 2) within a combustor section 16 disposed downstream of the compressor section 14, a turbine section 18 disposed downstream of the combustor section 16, and an exhaust section 20 disposed downstream of the turbine section 18. Additionally, the gas turbine 10 may include one or more shafts 22 coupled between the compressor section 14 and the turbine section 18.

The compressor section 14 may generally include a plurality of rotor disks 24 (one of which is shown) and a plurality of rotor blades 26 extending radially outwardly from and connected to each rotor disk 24. Each rotor disk 24 in turn may be coupled to or form a portion of the shaft 22 that extends through the compressor section 14.

The turbine section 18 may generally include a plurality of rotor disks 28 (one of which is shown) and a plurality of rotor blades 30 extending radially outwardly from and connected to each rotor disk 28. Each rotor disk 28 in turn may be coupled to or form a portion of the shaft 22 that extends through the turbine section 18. The turbine section 18 further includes an outer casing 31 that circumferentially surrounds the portion of the shaft 22 and the rotor blades 30, thereby at least partially defining a hot gas path 32 through the turbine section 18.

During operation, a working fluid such as air flows through the inlet section 12 and into the compressor section 14 where the air is progressively compressed, thus providing pressurized air 27 to the combustors 17 of the combustor section 16. The pressurized air 27 is mixed with fuel and burned within each combustor to produce combustion gases 33. The combustion gases 33 flow through the hot gas path 32 from the combustor section 16 into the turbine section 18, wherein energy (kinetic and/or thermal) is transferred from the combustion gases 33 to the rotor blades 30, causing the shaft 22 to rotate. The mechanical rotational energy may then be used to power the compressor section 14 and/or to generate electricity. The combustion gases 33 exiting the turbine section 18 may then be exhausted from the gas turbine 10 via the exhaust section 20.

Figure 2:
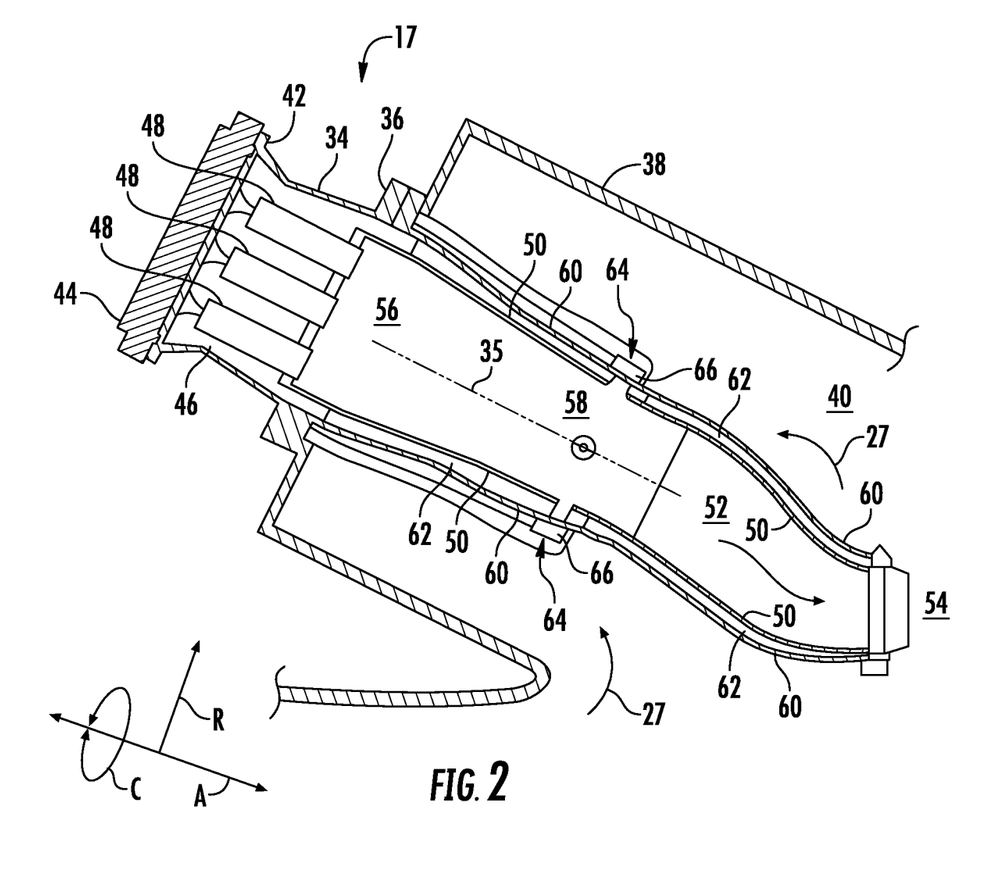
FIG. 2 illustrates a side view of a combustor in accordance with embodiments of the present disclosure.

FIG. 2 illustrates an exemplary embodiment of one of the combustors 17. As depicted, the combustor 17 defines an axial centerline 35 extending therethrough. In this respect, the combustor 17 defines an axial direction A, a radial direction R, and a circumferential direction C. In general, the axial direction A extends parallel to the axial centerline 32, the radial direction R extends orthogonally outward from the axial centerline 32, and the circumferential direction C extends concentrically around the axial centerline 32.

As shown in FIG. 2, the combustor 17 includes a combustor casing 34 having a first flange 36. In particular, the first flange 36 extends radially outwardly from the combustor casing 34 and couples to a compressor discharge casing 38. The combustor casing 34 and the compressor discharge casing 38 collectively define at least a portion of a high pressure plenum 40 in fluid communication with the compressor 14 (FIG. 1). As such, the combustor casing 34 and the compressor discharge casing 38 contain compressed air 27 entering the combustor 17 from the compressor 14. The combustor casing 34 also includes a second flange 42 that couples to an end cover 44. As shown in FIG. 2, the combustor casing 34 and end cover 44 collectively define a head end portion 46 of the combustor 17. The head end portion 46 is in fluid communication with the high pressure plenum 40 and/or the compressor 14. One or more primary fuel injectors 48 extend axially downstream from the end cover 44.

The combustor 17 also includes a liner 50 that at least partially defines a hot gas path 52 extending from the one or more primary fuel injectors 48 to an inlet 54 of the turbine section 18 (FIG. 1). In this respect, the liner 50 at least partially defines a primary or first combustion or reaction zone 56 in which a first fuel-air mixture combusts. The one or more primary fuel injectors 48 supply fuel to the first combustion zone 56. The liner 50 also at least partially defines a secondary combustion or reaction zone 58 positioned axially downstream from the first combustion zone 56 of the combustor 17. A second fuel-air mixture combusts in the second combustion zone 58. In the embodiment shown in FIG. 2, the liner 50 may be formed so as to include a tapering or transition portion. In particular embodiments, the liner 50 may be formed from a singular or continuous body with a generally cylindrical upstream portion and a tapering downstream portion. A flow sleeve 60 circumferentially surrounds and is radially spaced from at least a portion of the liner 50 to form a cooling flow annulus 62 therebetween. The combustor 17 may have different configurations in other embodiments.

In the embodiment shown in FIG. 2, the combustor 17 includes an axial fuel staging system 64 ("AFS system 64"). More specifically, the AFS system 64 includes one or more axial fuel staging injectors 66 ("AFS injectors 66") axially spaced from the one or more primary fuel injectors 48. In particular, the one or more AFS injectors 66 are disposed downstream of the one or more primary fuel injectors 48 and upstream of the inlet 54 to the turbine 18. In this respect, the one or more AFS injectors 66 supply fuel to the secondary combustion zone 58. The combustor 17 may include one, two, three, four, or more AFS injectors 66 that are circumferentially spaced around the liner 50.

Figure 3:
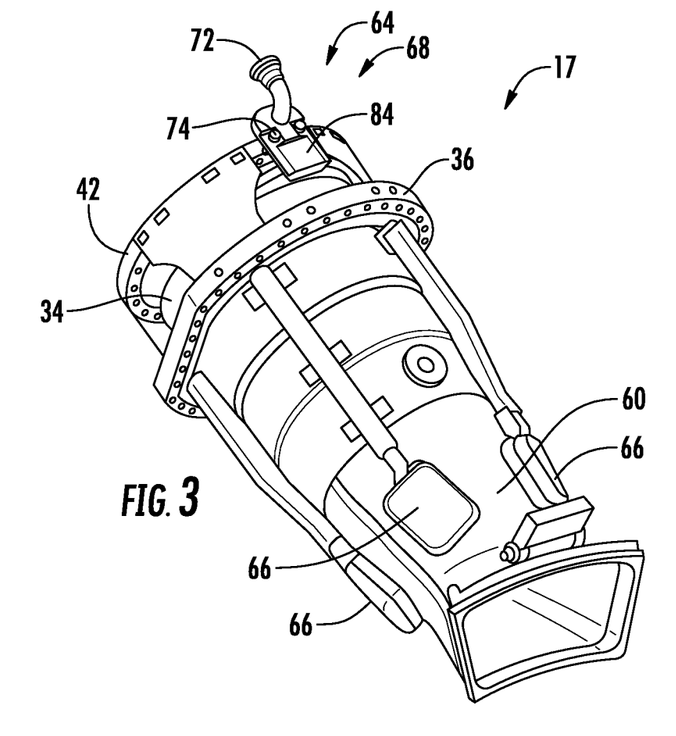
FIG. 3 illustrates a perspective view of a combustor in accordance with embodiments of the present disclosure.

FIG. 3 illustrates a perspective view of a combustor 17 having an AFS system 64 coupled thereto in accordance with an embodiment of the present disclosure. In particular, the AFS system 64 may include one or more fuel distribution manifolds 68. As shown, the fuel distribution manifold 68 may couple to the combustor casing 34. In many embodiments, the fuel distribution manifold 68 may couple to the second flange 42 of the combustor casing 34 via one or more bolts 74. In the embodiment shown in FIGS. 3 and 4, the AFS system 64 includes four fuel distribution manifolds 68 circumferentially spaced apart from one another and positioned radially outward from the combustor casing 34 and the end cover 44. In alternate embodiments, however, the AFS system 64 may include more or fewer fuel distribution manifolds 68, and/or each fuel distribution manifold 68 may be positioned at other locations around the combustor 17.

Figure 4:
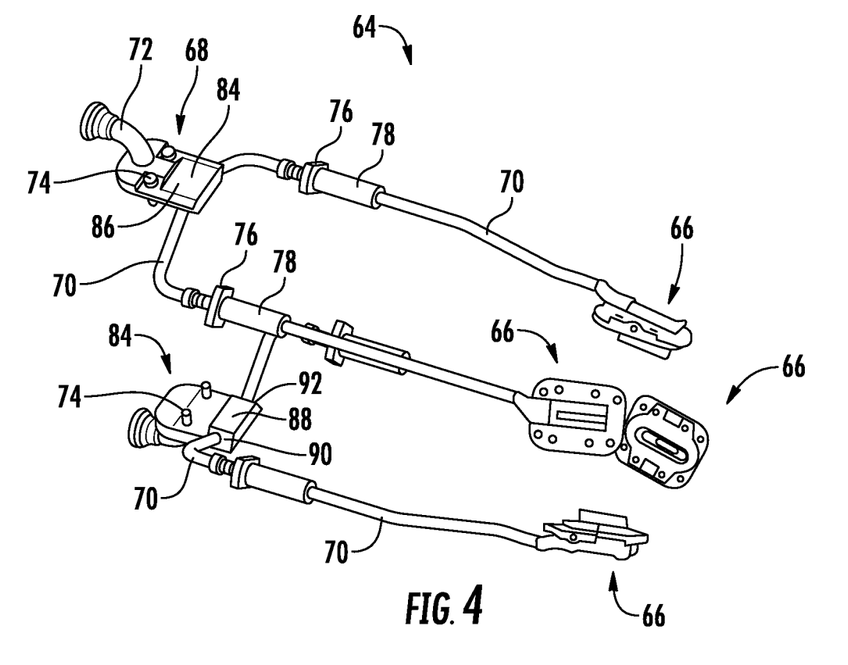
FIG. 4 illustrates a perspective view of an axial fuel staging system isolated from the combustor of FIG. 3, in accordance with embodiments of the present disclosure.

FIG. 4 illustrates the AFS system 64 shown in FIG. 3 isolated from the combustor 17, in accordance with one or more embodiments of the present disclosure. As shown, each fuel distribution manifold 68 may distribute the fuel to one or more fuel lines 70 coupled thereto for eventual delivery to one or more of the AFS injectors 66 (FIG. 2). As shown, the fuel lines 70 may each extend from the fuel distribution manifold 68 in opposite circumferential directions. As such, each fuel line 70 transports fuel from one of the fuel distribution manifolds 68 to one of the AFS injectors 66.

In some embodiments, two fuel lines 70 couple to each fuel distribution manifold 68. Each of these fuel lines 70 may then couple to different AFS injectors 66. In such embodiments, each fuel distribution manifold provides fuel to two AFS injectors 66. Nevertheless, one, three, four, or more fuel lines 70 may couple to each fuel distribution manifold 68 in alternate embodiments. Moreover, multiple fuel lines 70 may couple to the same AFS injector 66. The fuel lines 70 may be rigid (e.g., extruded metal) or flexible (e.g., braided metal). In many embodiments, the fuel lines 70 may change directions one or more times prior to reaching the AFS injectors 66. For example, each fuel line may extend generally circumferentially from the fuel distribution manifold 68 and curve around one or more corners to extend generally axially to the AFS injector 66.

As shown in FIGS. 3 and 4, each of the fuel distribution manifolds 68 may include a main body 84 having a radially outer face 86, a radially inner face 88, a first side 90, and a second side 92. In some embodiments, the radially outer face 86 may be a generally flat surface that extends in the axial and circumferential directions. Similarly, the radially inner face 88 may also be a generally flat surface that is substantially parallel to, and spaced apart from, the radially outer face 86. In many embodiments, the radially outer face 86 may have a circumferential length that is longer than the circumferential length of the radially inner face 88. As shown, the first side 90 may extend from the radially outer face 86 towards the axial centerline 35 of the combustor 17 at an angle. Similarly, the second side 92 may be circumferentially spaced from the first side 90 and may also extend from the radially outer face 86 towards the axial centerline 35 at an angle. In many embodiments, the first side 90 and the second side 92 may each extend from the radially outer face 86 to the radially inner face 88 and may converge towards one another.

Figure 5:
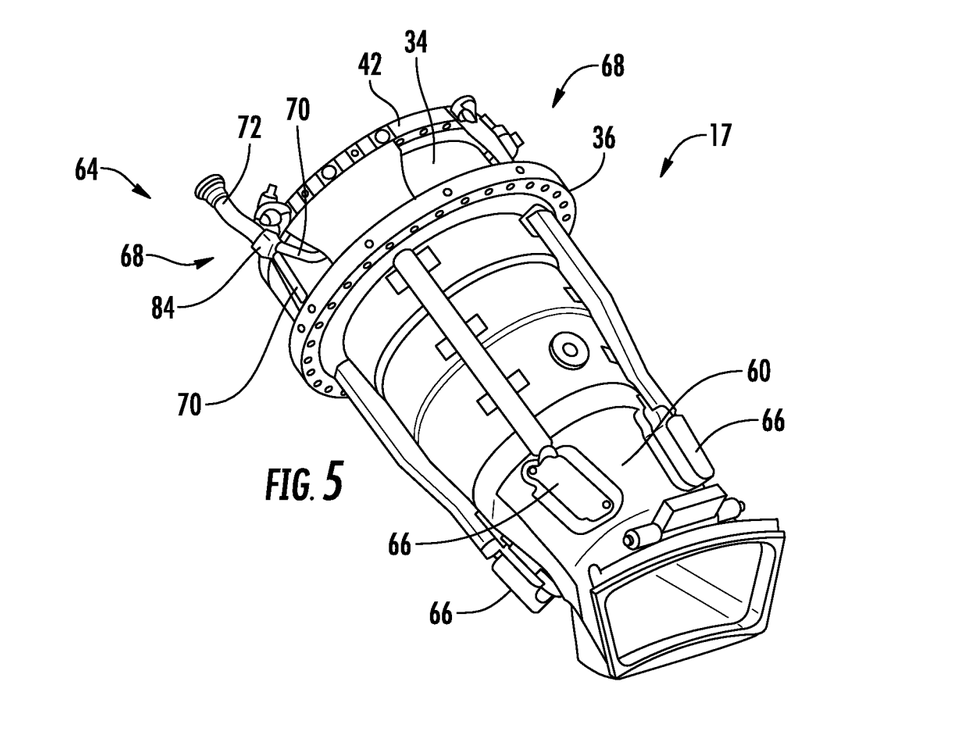
FIG. 5 illustrates a perspective view of a combustor in accordance with embodiments of the present disclosure.

FIG. 5 illustrates a perspective view of a combustor 17 having another AFS system 64 coupled thereto in accordance with another embodiment of the present disclosure. In particular, the AFS system 64 may include one or more fuel distribution manifolds 68. As shown, the fuel distribution manifold 68 may couple to the combustor casing 34. In many embodiments, the fuel distribution manifold 68 may couple to the second flange 42 of the combustor casing 34 via one or more bolts 74. In the embodiment shown in FIGS. 5 and 6, the AFS system 64 may include one or more fuel distribution manifolds 68 positioned radially outward from the combustor casing 34 and the end cover 44. In alternate embodiments, however, the AFS system 64 may include more or fewer fuel distribution manifolds 68, and/or each fuel distribution manifold 68 may be positioned at other locations around the combustor 17.

Figure 6:
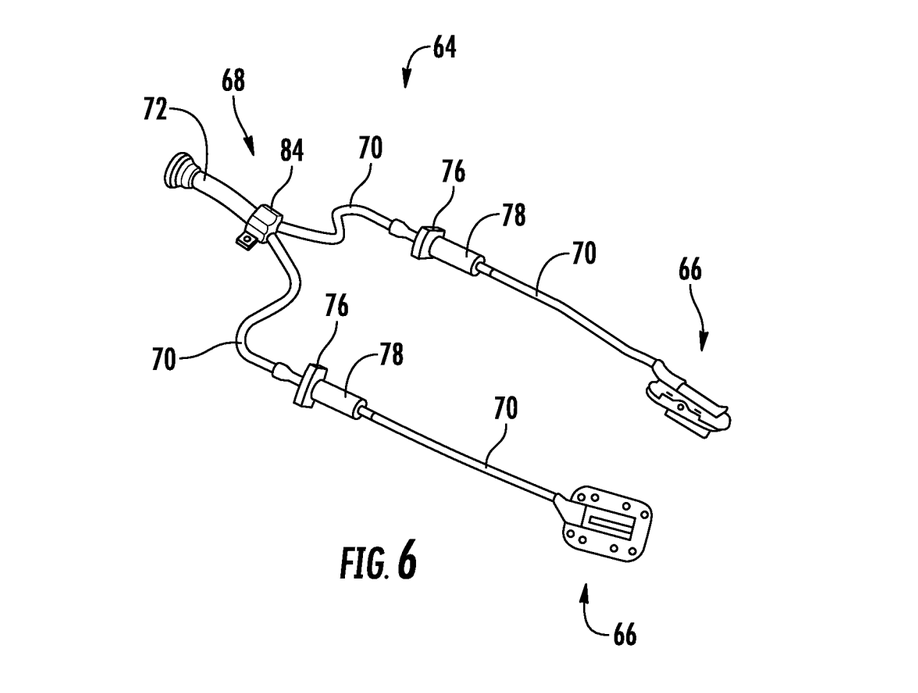
FIG. 6 illustrates a perspective view of an axial fuel staging system isolated from the combustor of FIG. 5, in accordance with embodiments of the present disclosure.

FIG. 6 illustrates the AFS system 64 shown in FIG. 5 isolated from the combustor 17 in accordance with one or more embodiments of the present disclosure. As shown, each fuel distribution manifold 68 may distribute the fuel to one or more fuel lines 70 coupled thereto for eventual delivery to one or more of the AFS injectors 66 (FIG. 2). As shown, the fuel lines 70 may each extend from the fuel distribution manifold 68 in opposite circumferential directions. As such, each fuel line 70 transports fuel from one of the fuel distribution manifolds 68 to one of the AFS injectors 66.

In some embodiments, two fuel lines 70 couple to each fuel distribution manifold 68. Each of these fuel lines 70 may then couple to different AFS injectors 66. In such embodiments, each fuel distribution manifold provides fuel 28 to two AFS injectors 66. Nevertheless, one, three, four, or more fuel lines 70 may couple to each fuel distribution manifold 68 in alternate embodiments. Moreover, multiple fuel lines 70 may couple to the same AFS injector 66. The fuel lines 70 may be rigid (e.g., extruded metal) or flexible (e.g., braided metal). As shown, the fuel lines 70 may each extend from the fuel distribution manifold 68 in a direction that is oblique to the axial direction A of combustor 17 (FIG. 2). In many embodiments, the fuel lines 70 may change directions one or more times prior to reaching the AFS injectors 66. For example, as shown in FIG. 6, each fuel line 70 may extend from the fuel distribution manifold 68 and curve in a serpentine or sinusoidal-like path around one or more corners before extending generally axially to the one or more AFS injectors 66.

As shown in FIGS. 3 through 6, the AFS system 64 may include one or more fuel supply lines 72 fluidly coupled to the fuel distribution manifolds. The fuel supply lines 72 may function to provide fuel from a fuel supply to the fuel distribution manifolds 68 for use in one or more of the AFS injectors 66. In many embodiments, the fluid supply lines 72 may be rigidly coupled to the fuel distribution manifolds 68, e.g. brazed, welded, or otherwise fixedly coupled to the fuel distribution manifolds 68.

Figure 7:
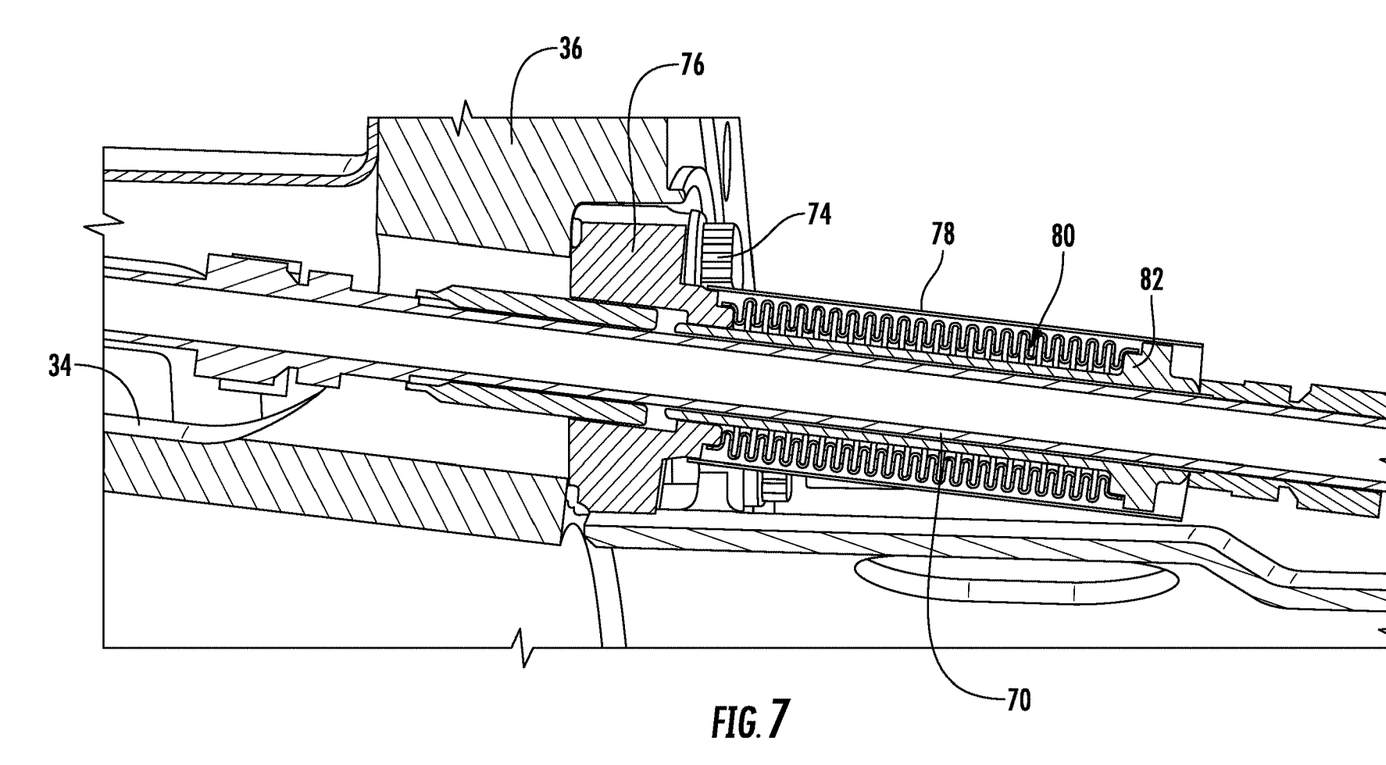
FIG. 7 illustrates a cross-sectional perspective view of a casing for a fuel line of an axial fuel staging system in accordance with embodiments of the present disclosure.

In many embodiments, as shown in FIGS. 3 through 6, the AFS system 64 may include one or more flanges 76 and one or more fuel line casings 78 downstream from the fuel distribution manifold 68. As shown in FIG. 7, the flanges 76 may couple each of the fuel lines 70 to the first flange 36 of the combustor casing 34. In many embodiments, the fuel line casings 78 may be positioned annularly around each of the fuel lines 70 and may extend from each of the flanges 76 in the downstream direction. In many embodiments, the fuel line casing 78 may be disposed downstream from the flange 76 and upstream from the AFS injectors 66 with respect to the direction of fuel passing through the fuel line 70. The fuel line casing 78 surrounds a portion of the fuel line 70 proximate to the flange 76 without extending over an entirety of the length between the flange 76 and the AFS injector 66.

FIG. 7 illustrates a cross-sectional perspective view of a fuel line casing 78 surrounding a fuel line 70. As shown, the fuel line 70 may extend through the second flange 36 of the combustor casing 34, the flange 76, and the fuel line casing 78. A bellows tube 80 may be disposed radially between the casing 78 and the fuel line 70. As shown, the bellows tube 80 may extend axially between the flange 76 and a bellows stop 82 to provide increased material compliance for the fuel line 70 during thermal expansion/contraction of the combustor 17. In many embodiments, the bellows tube 80 may be directly neighboring both of the fuel line casing 78 and the fuel line 70. In some embodiments, only a single bellows tube 80 may be disposed within the fuel line casing 78. In other embodiments (not shown), multiple bellows tubes 80 may be disposed within the fuel line casing 78.

Figure 8:
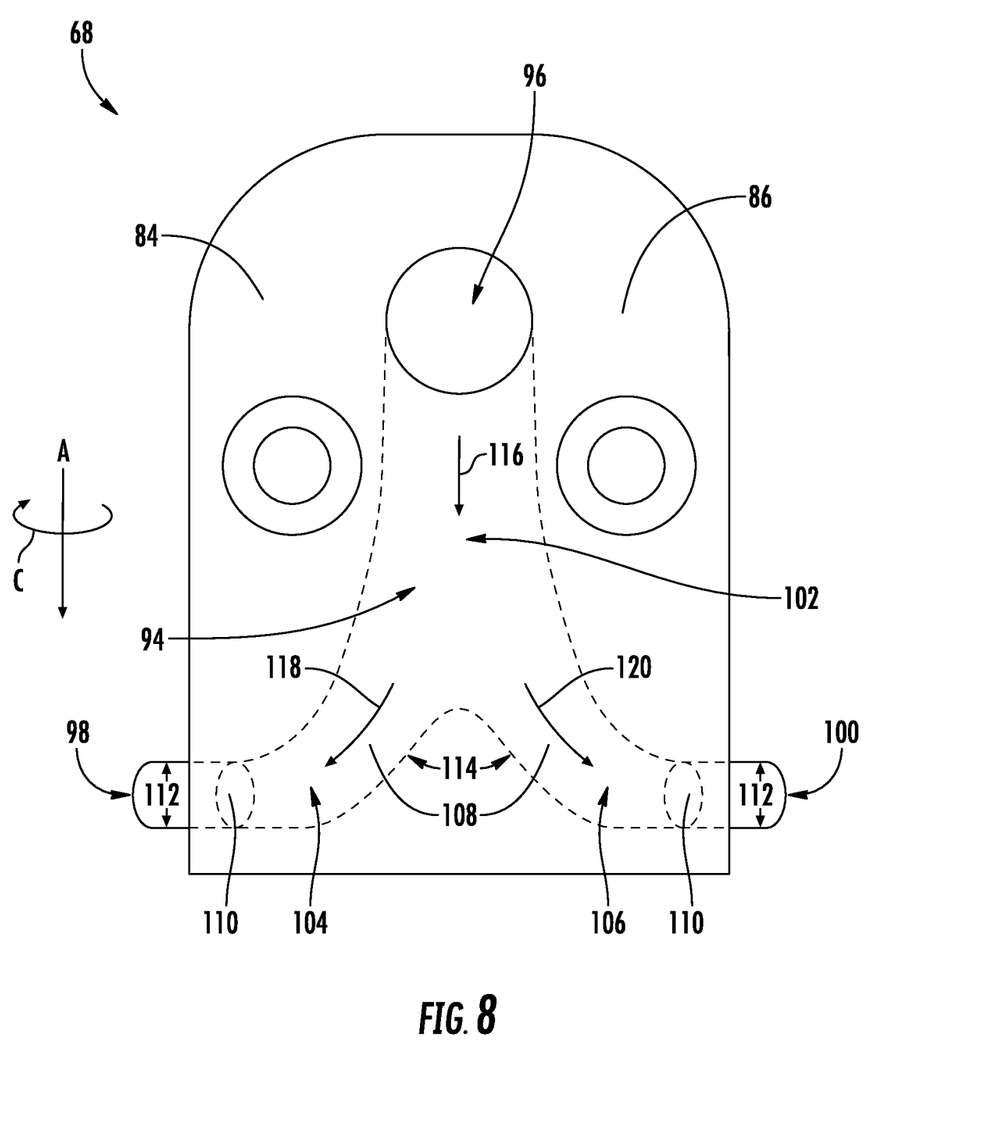
FIG. 8 illustrates a transparent view of the fuel distribution manifold of FIGS. 3 and 4, in accordance with an embodiment of the present disclosure.

FIG. 8 illustrates an enlarged transparent view of the fuel distribution manifold 68 shown in FIGS. 3 and 4. As shown in FIG. 8, the main body 84 of the fuel distribution manifold 68 may define a fuel circuit 94 therein. As shown, the fuel circuit 94 may include an inlet 96 that is disposed on the radially outer face 86, a first outlet 98 that is disposed on the first side 90 downstream from the inlet 96, and a second outlet 100 that is disposed on the second side 92 downstream from the inlet 96. The inlet 96 may be fluidly coupled to the fuel supply line 72 in order to provide fuel to fuel distribution manifold 68. Similarly, the first outlet 98 and the second outlet 100 may each be directly fluidly coupled to a fuel line 70 to provide fuel to one or more AFS injectors 66.

As shown in FIG. 8, the fuel circuit 94 may also include an inlet section 102 extending generally axially from the inlet 96 to a first branch section 104 and a second branch section 106. The inlet section 102 may be disposed upstream from the first branch section 104 and the second branch section 106 and in direct fluid communication therewith. In some embodiments, the first branch section 104 and the second branch section 106 may each be directly fluidly coupled to and continuous with the inlet section 102. In many embodiments, the inlet section 102, the first branch section 104, and the second branch section 106 may each extend seamlessly and/or continuously between one another, such that fuel may easily transition between the inlet section 102 and the branch sections 104, 106 without dropping in pressure. In some embodiments, the inlet section 102 may extend seamlessly between the branch sections 104, 106, such that there are no joints formed between the sections, e.g., weld joints, braze joints, etc. In many embodiments, the fuel circuit 94 may transition between the inlet section 102 and the branch sections 104, 106 without any sharp angles or sudden changes in direction, thereby allowing the fuel to split into multiple streams without dropping in pressure.

In many embodiments, the inlet section 102 may taper from the inlet 96 to the first branch section 104 and the second branch section 106. In some embodiments, the inlet section 102 may diverge radially outwardly as it extends in the axial direction A from the inlet 96 to the first branch section 104 and the second branch section 106 (as shown in FIG. 8). In other embodiments, the inlet section 102 may converge radially inwardly from the inlet 96 to the first branch section 104 and the second branch section 106 (as shown in FIG. 9).

As shown in FIG. 8, the first branch section 104 and the second branch section 106 may each include an oblique portion 108 and a circumferential portion 110. The oblique portion 108 of each of the first branch section 104 and the second branch section 106 may extend directly from the inlet section 102 in a direction that is oblique to the axial direction A of the combustor 17, i.e., not parallel or perpendicular to the axial direction A but at an angle. In many embodiments, as shown, the oblique portion 108 may taper along its length from a larger diameter at the inlet section 102 to a smaller diameter at the circumferential portion 110.

As shown, the circumferential portion 110 of each of the first branch section 104 and the second branch section 106 may extend directly from the oblique portion 108 in the circumferential direction C. Each of the circumferential portions 110 may be continuous and/or seamlessly connected to the respective oblique portions 108. In various embodiments, the circumferential portions 110 of the first branch section 104 and the second branch section 106 may each extend from an oblique portion 108 to an outlet 98, 100 in opposite circumferential directions. For example, the circumferential portion 110 of the first branch section 104 may extend from the oblique portion 108 of the first branch section 104 in a first circumferential direction, and the circumferential portion 110 of the second branch section 106 may extend from the oblique portion 108 of the second branch section 106 in a second circumferential direction opposite to the first circumferential direction. In various embodiments, the circumferential portion 110 of the first branch section 104 and the second branch section 106 may have a constant diameter 112 defined therein.

Figure 9:
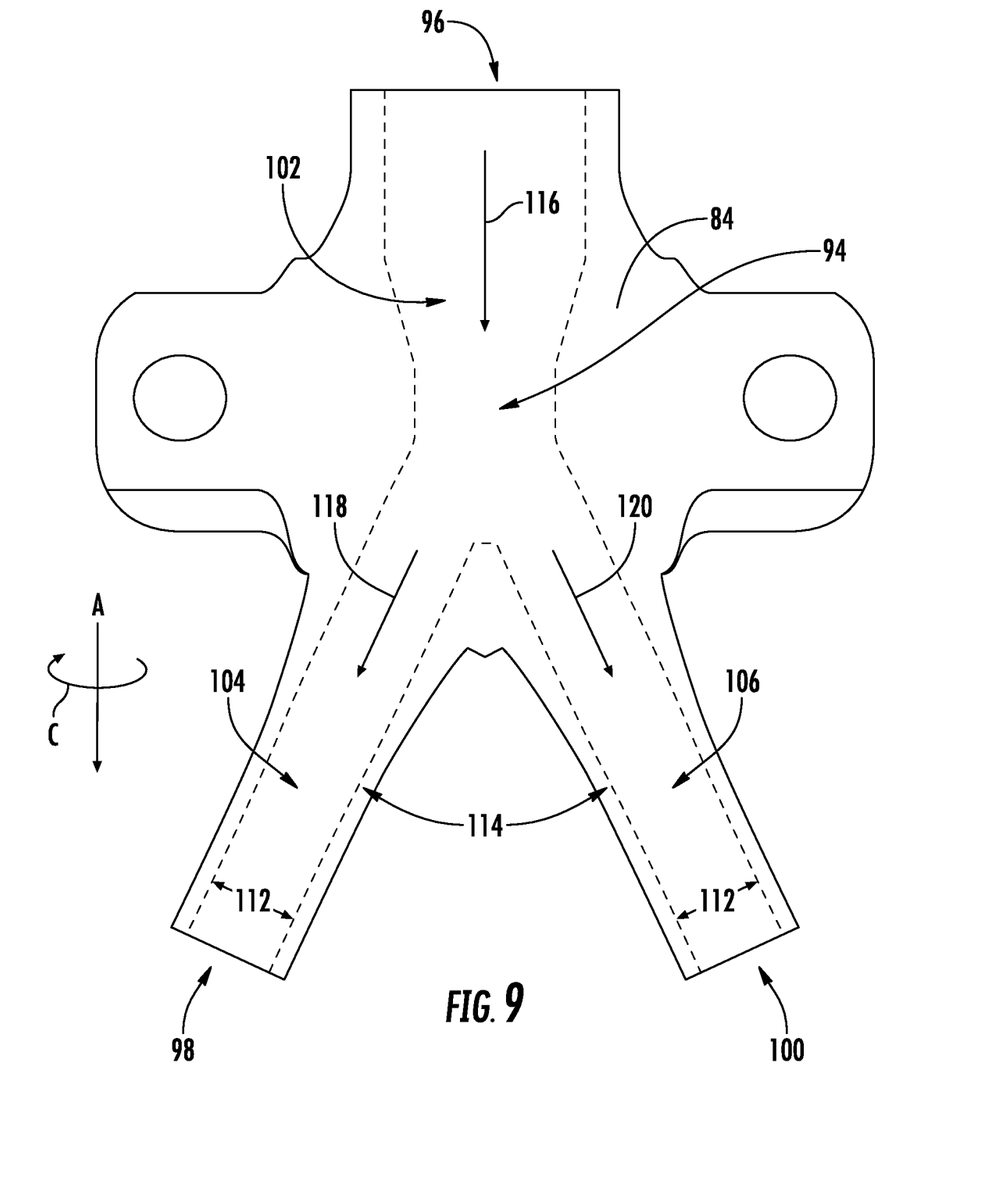
FIG. 9 illustrates a transparent view of the fuel distribution manifold of FIGS. 5 and 6, in accordance with an embodiment of the present disclosure.

FIG. 9 illustrates an enlarged transparent view of the fuel distribution manifold 68 shown in FIGS. 5 and 6. As shown, the first branch section 104 and second branch section 106 may be entirely oblique to the axial direction A of the combustor, i.e., without including a circumferential portion 110. In such embodiments, the first branch section 104 and the second branch section 106 may each extend directly from the inlet section 102 to the first outlet 98 and the second outlet 100, respectively, in a direction that is oblique to the axial direction A of the combustor. In many embodiments, each of the first outlet 98 and the second outlet 100 may be fluidly coupled to a respective fuel line 70 to provide fuel to the AFS injector 66. As shown in FIG. 9, the first branch section 104 and second branch section 106 may each have a constant diameter 112 defined therein.

In many embodiments, the constant diameter 112 of the first branch section 104 and second branch section 106 may be up to about 1.5 inches. Other embodiments, the constant diameter 112 of the first branch section 104 and the second branch section 106 may be between about 0.3 inches and about 1.2 inches. In various embodiments, the constant diameter 112 of the first branch section 104 and the second branch section 106 may be between about 0.5 inches and about 1 inch. In some embodiments, the constant diameter 112 of the first branch section 104 and the second branch section 106 may be between about 0.6 inches and about 0.8 inches. In particular embodiments, the constant diameter 112 of the first branch section 104 and second branch section 106 may be about 0.75 inches.

As shown, the first branch section 104 and the second branch section 106 diverge circumferentially away from each other as they extend axially from the inlet section 102 to the first outlet 98 and the second outlet 100, respectively. As shown in FIGS. 8 and 9, an angle 114 may be defined between the first branch section 104 and the second branch section 106. This angle 114 advantageously provides a smooth and continuous transition from a single stream of fuel 116 that flows within the inlet section 102 to a first fuel portion 118 and a second fuel portion 120 that flow within the first branch section 104 and the second branch section 106, respectively. The branch sections 104, 106 of the fuel circuit 94 evenly split the single stream of fuel 118 received by the fuel supply line 72 into a first fuel portion 118 and a second fuel portion 120 for distribution to AFS injectors 66 positioned downstream.

In many embodiments, the angle 114 between the first branch section 104 and the second branch section 106 may be up to about 150°. In other embodiments, the angle 114 between the first branch section 104 and the second branch section 106 may be between about 30° and about 120°. In some embodiments, the angle 114 between the first branch section 104 and the second branch section 106 may be between about 40° and about 100°. In various embodiments, the angle 114 between the first branch section 104 and the second branch section 106 may be between about 50° and about 90°.

As shown in FIGS. 8 and 9, the fuel circuit 94 may function to receive a single stream of fuel 116 from the inlet 96 and split the single stream of fuel 116 into two or more streams of fuel 118, 120. The fuel circuit 94 may be a single unitary circuit that is seamlessly and/or continuously defined within the main body 84, such that the single stream of fuel 116 flowing through the inlet section may easily transition to two or more streams of fuel 118, 120 at the branch sections 104, 106.

In many embodiments, the fuel circuit 94 may be integrally formed with the main body 84. It is to be understood that integrally formed includes any suitable method of forming the respective parts such that they comprise a single unitary whole. For example, the inlet section 102, the first branch section 104, and the second branch section 106 may each be a portion of the single unitary fuel circuit 94 that is defined in the main body 84 of the fuel distribution manifold 68. In many embodiments, the main body 84 of the fuel distribution manifold 68 may be formed having the fuel circuit 94 integrally formed therein, thus having a one-piece seamless construction. In this way, the fuel circuit 94 may be seamless such that it requires no joints and/or welds, which advantageously minimizes pressure drop across the fuel circuit 94. Suitable methods of integrally forming may include additive manufacturing, such as direct metal laser melting, selective laser sintering, or other suitable additive techniques. As another example, the main body 84 of the fuel distribution manifold 68 may be formed by casting the part and having the fuel circuit integrally defined within the main body 84.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A fuel distribution manifold coupled to a combustor casing of a combustor, the fuel distribution manifold comprising:
    a main body comprising a radially outer face, a radially inner face, a first side extending from the radially outer face towards an axial centerline of the combustor to the radially inner face, and a second side spaced from the first side and extending from the radially outer face towards the axial centerline of the combustor to the radially inner face;
    a fuel circuit defined within the main body, the fuel circuit comprising:
        an inlet section extending generally axially from a main inlet;
        a first branch section fluidly coupled to the inlet section, the first branch section including a first oblique portion and a first circumferential portion, the first oblique portion extending from a first inlet to the first circumferential portion, the first circumferential portion extending from the first oblique portion to a first outlet; and
        a second branch section fluidly coupled to the inlet section, the second branch section including a second oblique portion and a second circumferential portion, the second oblique portion extending from a second inlet to the second circumferential portion, the second circumferential portion extending from the second oblique portion to a second outlet;
        wherein the first branch section and the second branch section diverge circumferentially away from each other as the first branch section and the second branch section extend axially from the inlet section to the first outlet and the second outlet, respectively.

2. The fuel distribution manifold as in claim 1, wherein the fuel circuit is configured to receive fuel at the main inlet, and wherein all the fuel received at the main inlet is evenly distributed between only the first outlet and the second outlet.

3. The fuel distribution manifold as in claim 1, wherein the first branch section tapers in diameter from the first inlet to the first outlet, and wherein the second branch section tapers in diameter from the second inlet to the second outlet.

4. The fuel distribution manifold as in claim 1, wherein the fuel circuit extends seamlessly between the main inlet, the first outlet, and the second outlet.

5. The fuel distribution manifold as in claim 1, wherein the first outlet and the second outlet are circumferentially oriented.

6. The fuel distribution manifold as in claim 1, wherein the inlet section diverges from the main inlet to the first branch section and the second branch section.

7. The fuel distribution manifold as in claim 1, wherein the main inlet is disposed on the radially outer face, the first outlet is disposed on the first side, and the second outlet is disposed on the second side.

8. A combustor, comprising:
a combustor casing and an end cover coupled to the combustor casing;
a primary fuel nozzle that extends axially downstream from the end cover within the combustor casing;
a primary combustion zone defined downstream from the primary fuel nozzle;
a plurality of fuel injectors downstream from the primary combustion zone;
a fuel distribution manifold coupled to the combustor casing of the combustor and fluidly coupled to the plurality of fuel injectors, the fuel distribution manifold comprising:
a main body comprising a radially outer face, a radially inner face, a first side extending from the radially outer face towards an axial centerline of the combustor to the radially inner face, and a second side spaced from the first side and extending from the radially outer face towards the axial centerline of the combustor to the radially inner face;
a fuel circuit defined within the main body, the fuel circuit comprising:
an inlet section extending generally axially from a main inlet;
a first branch section fluidly coupled to the inlet section, the first branch section including a first oblique portion and a first circumferential portion, the first oblique portion extending from a first inlet to the first circumferential portion, the first circumferential portion extending from the first oblique portion to a first outlet; and
a second branch section fluidly coupled to the inlet section, the second branch section including a second oblique portion and a second circumferential portion, the second oblique portion extending from a second inlet to the second circumferential portion, the second circumferential portion extending from the second oblique portion to a second outlet;
wherein the first branch section and the second branch section diverge circumferentially away from each other as the first branch section and the second branch section extend axially from the inlet section to the first outlet and the second outlet, respectively.

9. The combustor as in claim 8, wherein the fuel circuit is configured to receive fuel at the main inlet.

10. The combustor as in claim 8, wherein each of the first branch section and the second branch section extends at an angle that is oblique to an axial direction of the combustor.

11. The combustor as in claim 8, wherein the fuel circuit extends seamlessly between the main inlet, the first outlet, and the second outlet.

12. The combustor as in claim 8, wherein the inlet section tapers from the main inlet to the first branch section and the second branch section.

13. The combustor as in claim 8, wherein the inlet section diverges from the main inlet to the first branch section and the second branch section.

14. The combustor as in claim 8, wherein the main inlet is disposed on the radially outer face, the first outlet is disposed on the first side, and the second outlet is disposed on the second side.

15. The fuel distribution manifold as in claim 1, wherein the first branch defines a first diameter, and wherein the second branch defines a second diameter.

16. The fuel distribution manifold as in claim 15, wherein the first diameter converges from the first inlet to the first outlet, and wherein the second diameter converges from the second inlet to the second outlet.

17. The combustor as in claim 8, further comprising a plurality of fuel lines, wherein each fuel line of the plurality of fuel lines fluidly couples the fuel manifold to a respective fuel injector of the plurality of injectors, and wherein each fuel line of the plurality of fuel lines comprises a fuel line flange, a bellows stop, a bellows surrounding each fuel line and extending between the fuel line flange and the bellows stop, and a fuel line casing surrounding the bellows.

18. The combustor as in claim 17, wherein the combustor casing comprises a first combustor casing flange and a second combustor casing flange axially spaced apart from the first combustor casing flange, wherein each fuel line of the plurality of fuel lines extends through the first combustor casing flange and is coupled to a downstream surface of the first combustor casing flange, and wherein the fuel manifold is coupled to the second combustion casing flange.

* * * * *